United States Patent [19]

Twardowski

[11] Patent Number: 4,692,228
[45] Date of Patent: Sep. 8, 1987

[54] REMOVAL OF ARSENIC FROM ACIDS

[75] Inventor: Zbigniew Twardowski, Mississauga, Canada

[73] Assignee: Tenneco Canada Inc. (ERCO division), Islington, Canada

[21] Appl. No.: 865,457

[22] Filed: May 21, 1986

[30] Foreign Application Priority Data

Jul. 23, 1985 [GB] United Kingdom ............... 8518601

[51] Int. Cl.$^4$ .............................................. C25R 1/00
[52] U.S. Cl. ............................... 204/105 R; 204/108; 204/130; 204/283; 204/287; 204/294
[58] Field of Search ................... 204/130, 180.1, 294, 204/182.3, 186, 105 R, 222, 284, 283, 108

[56] References Cited

U.S. PATENT DOCUMENTS

| | | | |
|---|---|---|---|
| 883,170 | 3/1908 | Christy | 204/284 |
| 2,529,237 | 11/1950 | Turner et al. | 204/284 |
| 2,615,839 | 10/1952 | Willier | 204/284 |
| 2,742,415 | 4/1956 | Lawrence et al. | 204/130 |
| 3,102,085 | 8/1963 | Edwards et al. | 204/130 |
| 3,457,152 | 7/1969 | Maloney et al. | 204/130 |
| 3,919,062 | 11/1975 | Lundquist et al. | 204/130 |
| 4,146,447 | 3/1979 | Houlachi et al. | 204/130 |
| 4,474,654 | 10/1984 | Hyvärinen | 204/105 R |

Primary Examiner—R. L. Andrews
Attorney, Agent, or Firm—Sim & McBurney

[57] ABSTRACT

Dissolved arsenic (III) contaminant is removed from mineral acids, such as hydrochloric acid, by electrolysis using a high surface area cathode having a three-dimensional electrolyte-contacting surface which exposes the electrolyte to electrolysis for a relatively long period of time. The dissolved arsenic is reduced to arsenic metal, which then plates out on the cathode. Dissolved concentrations of arsenic of less than 1 ppm can be achieved using the invention.

16 Claims, 9 Drawing Figures

REMOVAL OF ARSENIC FROM ACIDS

FIELD OF INVENTION

The present invention relates to the removal of arsenic values from acidic media.

BACKGROUND TO THE INVENTION

Arsenic often is present as a contaminant in mineral acids, for example, phosphoric acid and hydrochloric acid, and is desirably removed therefrom to permit the acid to be used in a variety of applications. For example, thermal grade phosphoric acid is contaminated with dissolved arsenic at a typical level of 20 to 50 ppm.

One manner of processing such phosphoric acid to remove the arsenic values is to contact the phosphoric acid, while hot, with sodium chloride, which forms phosphate salts from the phosphoric acid and HCl and $AsCl_3$ gases. The gases are removed and contacted with water to form hydrochloric acid containing the arsenic trichloride. The hydrochloric acid then is dearsinated by precipitation of the arsenic values as $As_2S_3$ by the addition of $Na_2S$ or $H_2S$. The purified hydrochloric acid then may be used for a variety of purposes.

This prior art process is effective in removing the arsenic contamination but a large excess of sulfide ion is needed when the HCl concentration is higher than about 30% or the temperature is elevated and the remaining sulfide ion in the treated acid must be destroyed.

SUMMARY OF INVENTION

In accordance with the present invention, a new method of removal of dissolved arsenic values from hydrochloric acid, phosphoric acid, or any other mineral acid contaminated thereby, is provided which comprises electrolytically reducing dissolved trivalent arsenic ions to metallic arsenic using an electrolytic cell having a large surface area cathode having a three-dimensional electrolyte-contacting surface.

The term "large surface area" in relation to the cathode used in the process of the invention refers to an electrode of the type wherein the electrolyte is exposed to a large surface area of electrode surface in comparison to the physical dimensions of the electrode. The electrode is formed with interstices through which the electrolyte flows, and so has a three-dimensional surface of contact with the electrolyte.

The large surface area cathode used in this invention may be the so-called "flow through" type, wherein the electrode is formed of electroconductive porous material, for example, layers of graphite cloth and the electrolyte flows parallel to the current through the porous structure while being subjected to electrolysis, and thereby is exposed to the high surface area of the mesh of the electrode.

The high surface area cathode used in this invention also may be the so-called "flow by" type, wherein the electrode comprises a packed bed of individual electroconductive particles, for example, graphite particles, and the electrolyte flows perpendicularly to the current through the packed bed while being subjected to electrolysis, and thereby is exposed to the high surface area of the electroconductive particles in the packed bed.

The high surface area of the cathode permits the electrolyte to contact the cathode for an extended period of time, so as to permit electrolytic reduction of the arsenic ions to arsenic metal to occur. The arsenic metal plates out on the cathode. Residual arsenic concentrations of less than 1 ppm can be achieved using this invention.

The surface area employed and the conditions of operation of the electrolytic cell depend on the concentration of arsenic present in the liquor to be treated and the physical form of the electrode. Depending on the cell capacity, the electrolyte may be circulated a number of times through the high surface area cathode to remove the dissolved arsenic.

For a packed bed cathode using graphite particles, the electrochemically-active surface area usually varies from about 50 to about 500 sq.cm/c.c., preferably about 100 to about 200 sq.cm/c.c.

The flow rate of catholyte in contact with the large surface area cathode may vary widely and generally the linear catholyte flow rate is about 10 to about 30 cm/min.

In carrying out the electrolysis reaction, reduction of arsenic ions to arsenic metal is desired and electrode potential conditions which favour the further reduction of arsenic metal to highly toxic arsine are generally avoided.

The electrolytic cell in which the arsenic removal is effected in accordance with this invention may have any desired construction consistent with the requirement that the cathode have a high surface area, so as to provide a long flow path for the catholyte in contact with a three-dimensional network of electrode surface.

The cell may be provided with an ion-exchange membrane, separating the anode compartment from the cathode compartment. For example, when arsenic-containing HCl solutions are processed, an ion-exchange membrane is preferred, so as to prevent chlorine formed at the anode from being reduced at the cathode and reacting with arsenic deposited on the cathode. In addition, oxidation of trivalent arsenic to pentavalent arsenic ions, which are electrolytically inactive, also is avoided.

Since pentavalent arsenic ions are electrolytically inactive and hence are not removed by the process of the invention, when any such pentavalent arsenic ions are present, they first may be reduced chemically to the trivalent form for removal by the process of the invention. Any convenient chemical reductant may be used, including hydrazine, sulphur dioxide and hydroxylamine hydrochloride.

The anode of the cell may be constructed of any desired material, for example, graphite or electroconductive metal. For a membrane-divided cell, the anolyte may be any desired electrolyte and typically comprises an acidic medium. The flow rate of anolyte through the anode compartment may vary widely and typically is about 1 to about 10 cm/min.

The invention is applicable to any trivalent arsenic-containing aqueous medium, including acidic solutions containing the same. The dissolved concentration of arsenic may vary depending on the source of the medium to be treated. For example, the trivalent arsenic-containing aqueous medium may be a hydrochloric acid solution containing about 70 to about 200 ppm $AsCl_3$ produced by dearsenation of phosphoric acid, as described above.

DESCRIPTION OF PREFERRED EMBODIMENT

Figure 1:
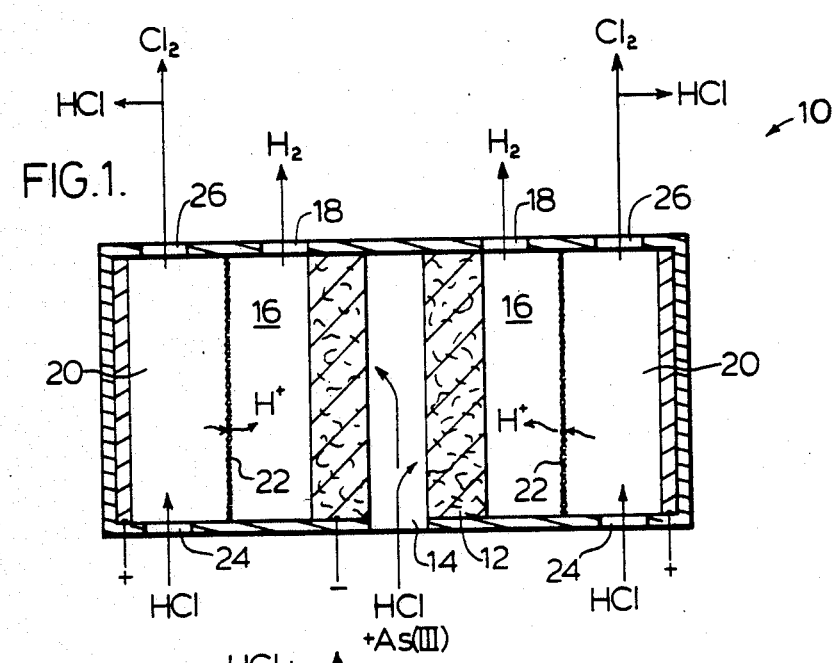
FIG. 1 is a sectional schematic representation of an electrolytic unit comprising two cells for purifying arsenic-contaminated hydrochloric acid or other mineral acid in accordance with one embodiment of the present invention.

Referring first to FIG. 1 of the drawings, an electrolytic unit 10 having a generally rectangular structure, comprising two cells for convenience, has a central flow-through planar porous high surface area cathode 12 having an inlet 14 for the introduction of arsenic-contaminated acid to the porous electrode 12 and for passage of arsenic-contaminated acid therethrough to each of the catholyte compartments 16. The catholyte compartments 16 have outlets 18 for venting hydrogen formed at the cathode from the cell 10 and for removal of electrolytically-treated acid.

The catholyte compartments 16 are separated from their corresponding anolyte compartments 20 by ion-exchange membranes 22. Each anolyte compartment has an anolyte liquid inlet 24 and an anolyte product outlet 26.

Hydrochloric acid contaminated with arsenic is fed to contaminant inlet 14 while hydrochloric acid is fed to the anolyte inlet 24. The procedure is also applicable to the purification of other arsenic-contaminated mineral acids, for example, phosphoric acid. Similarly, other mineral acids may be substituted for hydrochloric acid as the anolyte acid.

The porous three-dimensional flow-through cathode 12, which may be constructed of carbon cloth, carbon felt or a solid carbon foam, provides a porous network of interstices through which the electrolyte percolates. An extended flow path for the contaminated acid thereby is provided so that the acid is exposed to a large surface area of electrode. In this way, the negative electrode potential of the cathode is applied for sufficient time to convert the generally low concentration of As(III) ions to arsenic metal, which in turn is deposited on the cathode 12.

If the cathode 12 has an insufficiently-large surface area to permit all the arsenic contamination to be removed in one pass, the residual contaminated acid removed from the catholyte compartment through outlet 18 may be recirculated through the cathode, and this procedure may be repeated until the residual As(III) contamination is at the desired low level.

Hydrogen ions migrate from the anolyte chamber 20 through the membrane 22 to the catholyte chamber 16 and are discharged at the cathode to form hydrogen gas which is vented through the outlets 18. At the anode, chloride ions are discharged and form chlorine gas which is vented through the outlet 26 along with spent anolyte. If another acid is substituted for hydrochloric acid as the anolyte, for example, sulphuric acid or phosphoric acid, then oxygen is evolved at the anode rather than chlorine. In either case, the use of an ion exchange membrane 22 is desirable to prevent oxidation of deposited metal arsenic or arsenic (III) at the cathode.

The potential reactions involved in the cell 10 are as follows:

Cathode:
$2H^+ + 2e \longrightarrow H_2$
$As(III) + 3e \longrightarrow As° \text{ or}$
$As(III) + 3H + 6e \longrightarrow AsH_3$ Anode:
$2Cl^- \longrightarrow Cl_2 + 2e$
$H_2O \longrightarrow O_2 + 2H^+ + 2e$ The production and evolution of the highly toxic arsine (AsH$_3$) is undesirable and the electrolysis, therefore, should be effected under electrical potential conditions which do not favour the further reduction of the arsenic metal to arsine.

The actual electrical potential employed depends on the form of the cathode and the current density which thereby results from the potential and is the value at which arsine is produced is readily determined for a particular unit.

As arsenic metal builds up in the porous carbon cathode 12, the pores of the cathode become more resistant to liquid flow and more pressure is required to pump the contaminated acid through the cathode. In the extreme, this effect may lead to flaking off and washing away of deposited arsenic metal. The cathode eventually must be regenerated or replaced. The large surface area, however, ensures relatively long term effectiveness for the cathode, since only a small proportion of the surface area is rendered ineffective by the deposition thereon of arsenic metal during the treatment of any particular contaminated medium.

The electrolysis procedure effected in the electrolytic unit 10 may be effected in any convenient manner, including constant current, constant voltage and controlled cathode potential. Generally, the latter procedure is the preferred one but requires a potentiostat and a reference electrode. A constant voltage operation generally is satisfactory.

In such a constant voltage operation, the voltage which is applied has been found to vary depending on the form of the anode. For a metal anode, such as platinized titanium or equivalent, the voltage applied typically is about 1.6 to 2.0 volts while for a graphite anode, the voltage applied typically is about 1.9 to 2.5 volts.

Arsenic may be recovered from the spent cathode and the cathode thereby regenerated for use, by a variety of techniques, for example, by polarity reversal or by dissolution in alkaline or acid solutions in the presence of an oxidizing gas, for example, chlorine gas. The arsenic removed from the cathode in this way may be separated in solid form from the aqueous phase by suitable treatment, for example, with Na₂S.

Figure 2:
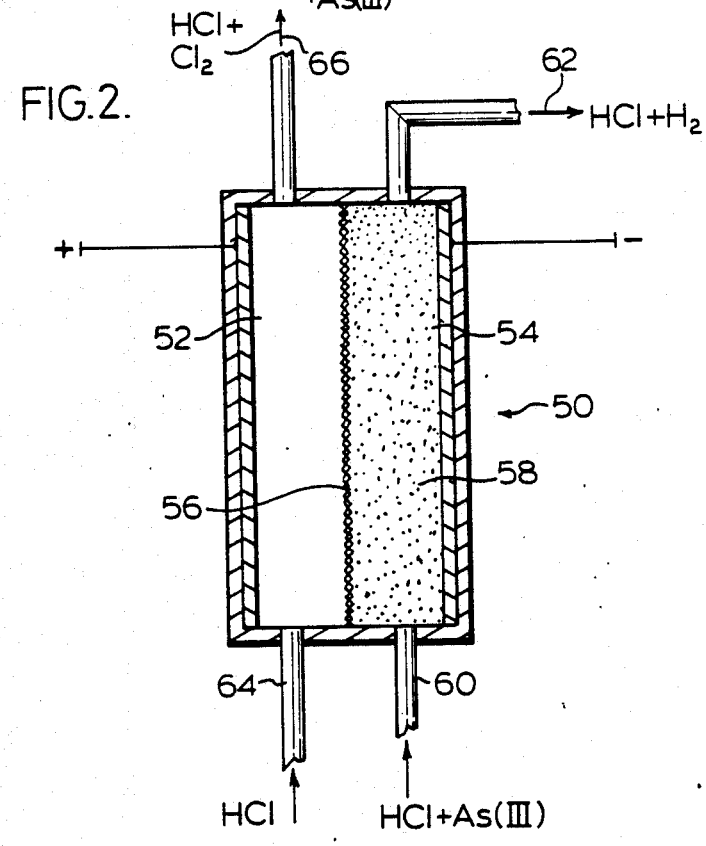
FIG. 2 is a sectional schematic representation of an electrolytic cell for purifying arsenic-contaminated hydrochloric acid or other mineral acid in accordance with a second embodiment of the present invention.

The electrolytic unit 10 uses a flow-through cathode 12 to effect electrolytic removal of the arsenic contamination, i.e. the electrolyte flows parallel to the current. Alternately, a flow-by cell arrangement, wherein the electrolyte flows perpendicularly to the current, may be employed, as illustrated in FIG. 2.

In this embodiment, the cell unit 50 is divided into an anolyte chamber 52 and a catholyte chamber 54 by an ion-exchange membrane 56. The catholyte chamber 54 contains a packed bed of particles of a suitable medium 58 for deposition of arsenic metal during electrolysis as the feed of arsenic (III)-contaminated hydrochloric acid (or other arsenic-contaminated mineral acid), received by line 60, percolates through the chamber. The deposition medium 58 may be carbon or graphite particles or the like. Arsenic-depleted hydrochloric acid and hydrogen are removed from the catholyte chamber by line 62. Hydrochloric acid or other mineral acid is fed to the anolyte compartment 52 by line 64 and hydrochloric acid and chlorine are removed from the anolyte chamber by line 66.

The present invention enables dissolved trivalent arsenic to be substantially completely removed from aqueous medium by electrolytic treatment using a high surface area three-dimensional cathode and thereby avoids the problems of the prior art.

EXAMPLES

EXAMPLE 1

A laboratory electrolytic cell of the type illustrated in FIG. 1 was set up. The cell consisted of an expanded mesh DSA anode, an ion exchange separator constructed of Nafion 125 and a cathode bed composed of five layers of carbon cloth (from Stackpole Limited) stacked together and stitched onto a ribbed graphite current distributor. The external surface area of the resulting three-dimensional cathode was 42 cm² (although the true or electrically-effective surface area was perhaps 3 to 4 orders of magnitude higher). The approximate volume of the cathode bed was 25 cm³.

Hydrochloric acid (37%) containing 125 ppm of As(III) and phosphoric acid (92%) containing 22 ppm of As(III) were electrolyzed in a series of experiments using the laboratory cell described above by forcing the hydrochloric acid through the cathode bed while hydrochloric acid, phosphoric acid or sulphuric acid anolyte was passed through the anolyte compartment and an electrode potential was applied between the cathode and the anode immersed in the anolyte. A small calomel electrode embedded in the cathode permitted measurement of the cathode potential during electrolysis.

In these experiments, the membrane separator transferred exclusively H⁺ ions generated at the anode and prevented the products of As(III) reduction from being oxidized at the anode. As safety precautions, both anode and cathode generated gases were scrubbed in NaOH and I₂/KI solutions, respectively, and the cathodic hydrogen was frequently monitored for the presence of AsH₃ by means of arsine-specific Draeger tubes.

Most of the experiments were run in a batch mode where a known volume (300 mls) of the arsenic-containing hydrochloric acid was circulated through the cathode bed and the reduction of the acid As(III) content was followed in time. As(III) analyses were effected by a standard colorimetric method. All experiments were performed under galvanostatic conditions and the cathode potential plus cell voltage were recorded during each run.

The effect of the variation of a number of electrolysis parameters was determined and graphical representations of these effects appear as FIGS. 3 to 8. Essential parameters of operation appear on these graphical representations.

Figure 3:
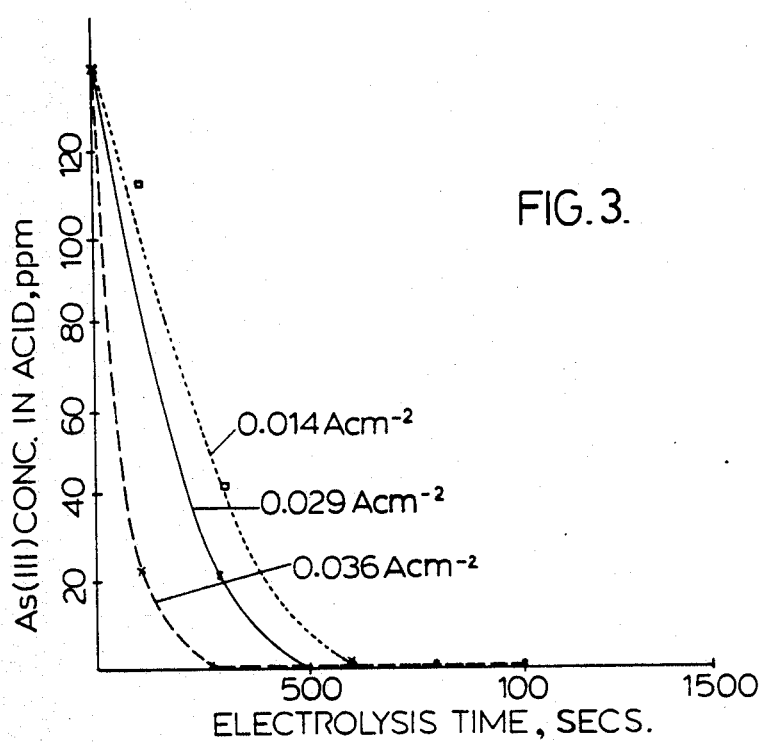
FIG. 3 is a graphical representation of the effect of cathode current density on electrolysis time for removal of As(III) from hydrochloric acid.
Figure 4:
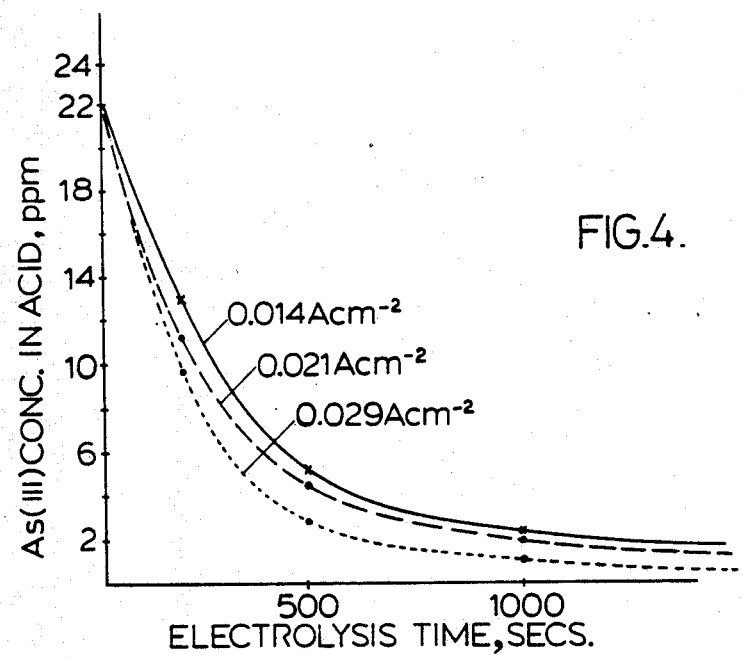
FIG. 4 is a graphical representation of the effect of cathode current density on electrolysis time for removal of As(III) from phosphoric acid.

FIGS. 3 and 4 illustrate the effect of current density on the effectiveness of removal of the As(III) from the hydrochloric acid and the phosphoric acid, respectively. For a truly diffusion-controlled process, the current density should not have any effect once the limiting current has been reached for the reduction process of interest. The data appearing in FIG. 3 implies that the limiting current has not yet been reached. On the other hand, the slopes of the curves, at least in their lower portion, are inversely logarithmic and are typical for a diffusion-controlled process. Since the next electrode process following the reduction of As(III) to As° is the evolution of H₂, it is reasonable to conclude that the evolving H₂ provides efficient stirring at the electrode surface, which intensifies with increased current and hence increases the As(III) reduction limiting current.

As may be seen from FIG. 4, the electrolysis of the phosphoric acid is generally more sluggish, under comparable conditions, despite the lower initial As(III) content. However, this difference may be attributed to the substantially higher viscosity of 92% H₃PO₄ as compared to 37% HCl.

Figure 5:
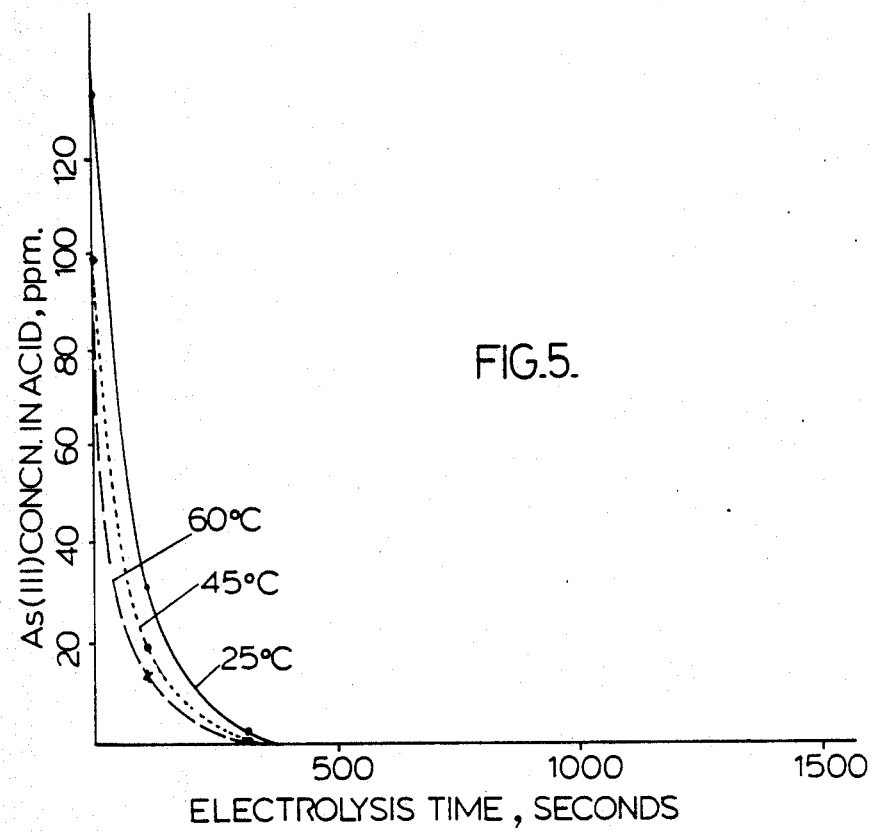
FIG. 5 is a graphical representation of the effect of electrolysis temperature on electrolysis time for removal of As(III) from hydrochloric acid.
Figure 6:
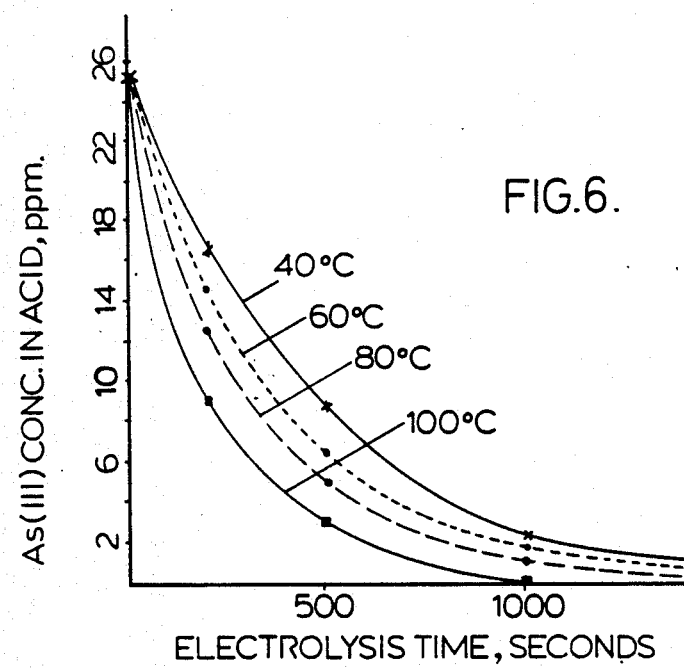
FIG. 6 is a graphical representation of the effect of electrolysis temperature on electrolysis time for removal of As(III) from phosphoric acid.

FIGS. 5 and 6 illustrate the effect of electrolysis temperature on the effectiveness of removal of the As(III) from the hydrochloric acid and the phosphoric acid, respectively. The electrolysis temperature affects the viscosity of the solution and consequently the diffusion coefficient of As(III). A reduction in electrolysis time, therefore, would be expected at higher temperatures and to be more pronounced for the lower viscosity hydrochloric acid solution. These expectations are borne out by the data presented in FIGS. 5 and 6.

Figure 7:
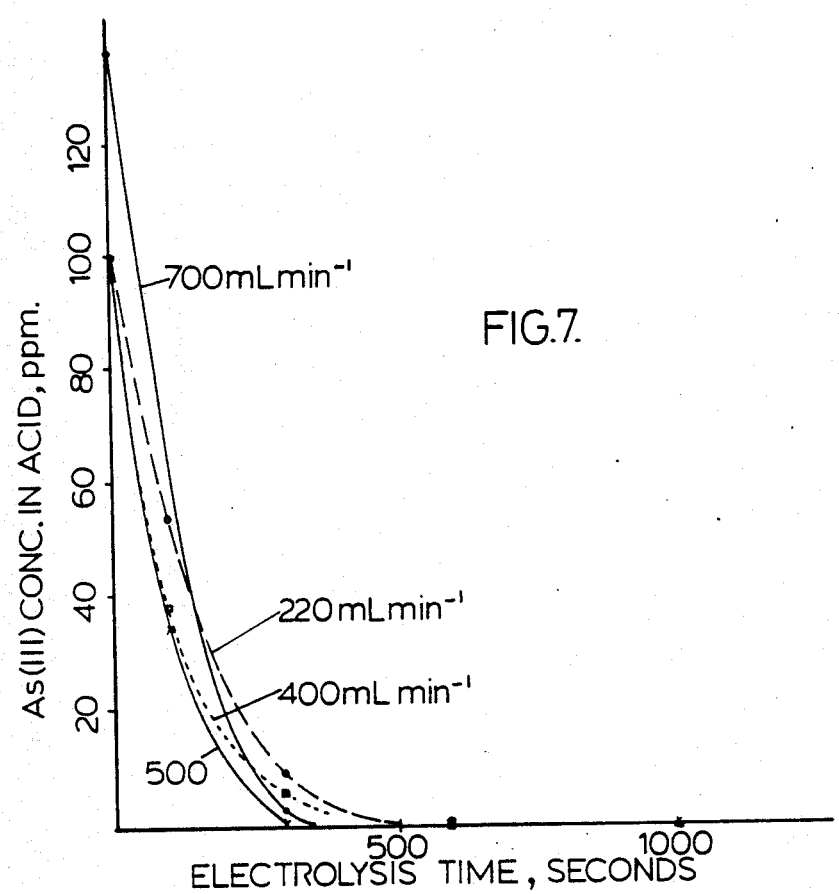
FIG. 7 is a graphical representation of the effect of catholyte recirculation rate on As(III) removal from hydrochloric acid.

FIG. 7 illustrates the effect of the recirculation rate on the effectiveness of removal of the As(III) from hydrochloric acid. An increased recirculation rate increases the As(III) reduction limiting current and this effect is amply demonstrated by the results depicted in FIG. 3.

Figure 8:
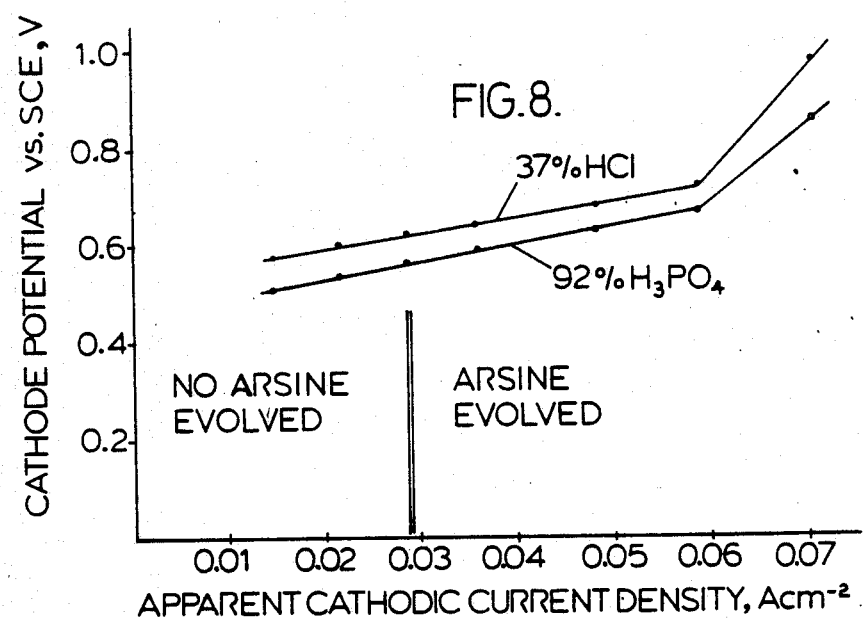
FIG. 8 is a graphical representation of the effect of variation of cathode potential and cathode density on arsine evolution from both hydrochloric acid and phosphoric acid.

The effect of superficial cathodic current density on the potential for evolution of arsine is illustrated in FIG. 8. The formation of the highly toxic gaseous arsine is undesirable from a safety standpoint. As the cathodic current density increases, the cathode becomes polarized to progressively more negative potentials until arsine evolution results. As may be seen in FIG. 8, wherein the correlation of apparent cathodic current density and AsH₃ is shown in current-voltage curves, no arsine is detected at current densities up to 0.029 A/cm², traces are observed at 0.036 A/cm² and definite AsH₃ evolution takes place at 0.048 A/cm² and above. An exact similar relationship was formed for the hydrochloric acid and phosphoric acid.

EXAMPLE 2

A number of experiments were conducted in a laboratory packed bed type cell of the type illustrated in FIG. 2. The cathode bed had dimensions of 2"×2.5"×2" (depth), was packed with Union Carbide graphite particles UCAR A-20 (average diameter 1.5 mm), and had a total bed volume of 160 ml. The anode as platinized titanium. Current was provided to the cathode bed by means of a graphite plate current distributor. The cell current was varied between 0.5 and 1.5 A while the acid flow was varied in the range of 100 to 550 ml/min. In most cases, a 1-litre sample of 37% HCl having an initial As(III) concentration of 100 to 110 ppm was passed repeatedly through the cathode bed at a flow rate of 100 to 300 ml/min. Typically four passes were required to decrease the As(III) concentration to a steady state value of about 2 ppm.

EXAMPLE 3

Figure 9:
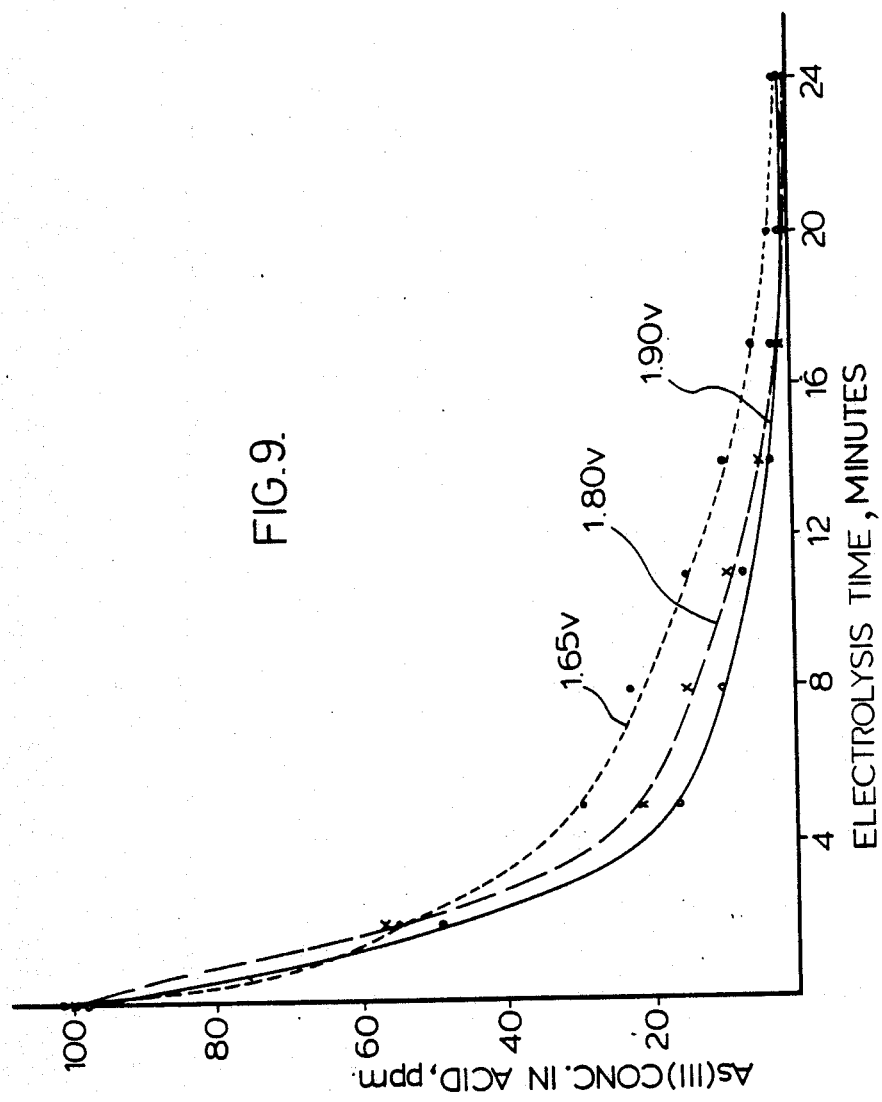
FIG. 9 is a graphical representation of the effect of cell voltage on electrolysis time for As(III) removal from hydrochloric acid for a packed bed cell operated at a constant voltage.

A packed bed cell of the type described in Example 2 was employed. A 1-liter sample of 37% HCl was passed repeatedly through the cathode bed at a recirculation rate of 250 ml/min. A constant voltage of 1.65 bolts, 1.80 volts and 1.90 volts was applied in different experiments and the effect on arsenic removal was observed. The results obtained are reproduced in FIG. 9.

SUMMARY OF DISCLOSURE

In summary of this disclosure, the present invention is effective in removing arsenic from mineral acids contaminated with As(III) by electrolytic deposition employing an electrochemical potential which produces arsenic metal. High surface area cathodes are employed for this purpose and the deposited arsenic may subsequently be stripped from the spent electrode. Modifications are possible within the scope of this invention.

What I claim is:

1. A method for removal of dissolved arsenic (III) ions from hydrochloric acid, which comprises cathodically reducing the dissolved arsenic (III) ions to metallic arsenic in an electrolytic cell having a large surface area cathode with interstices through which said arsenic-contaminated hydrochloric acid flows during said cathodic reduction, said interstices defining a three-dimensional electrolyte-contacting surface, and depositing the arsenic metal so produced on said cathode.

2. The method of claim 1 wherein said cathode is in the form of an electroconductive mesh structure through the interstices of which the arsenic-contaminated hydrochloric acid flows during said cathodic reduction, generally parallel to the current.

3. The method of claim 2 carried out in a membrane cell wherein the anode compartment and cathode compartment are separated by an ion-exchange membrane.

4. The method of claim 1 wherein said cathode is in the form of a packed bed of individual electroconductive particles through which the arsenic-contaminated hydrochloric acid percolates during said cathodic reduction, generally perpendicular to the current.

5. The method of claim 4 carried out in a membrane cell wherein the anode compartment and cathode compartment are separated by an ion exchange membrane.

6. The method of claim 4 wherein said electroconductive particles are graphite and the electrochemically-active surface area of said packed bed is about 50 to about 500 sq.cm/c.c.

7. The method of claim 5 wherein said surface area is about 100 to about 200 sq.cm/c.c.

8. A method for the removal of dissolved arsenic (III) ions from phosphoric acid, which comprises cathodically reducing the dissolved arsenic (III) ions to metallic arsenic in an electrolytic cell having a large surface area cathode with interstices through which said arsenic-contaminated phosphoric acid flows during said cathodic reduction, said interstices defining a three-dimensional electrolyte-contacting surface, and depositing the arsenic metal so produced on said cathode.

9. The method of claim 1 carried out under electrical power conditions such that the formation of arsine is avoided.

10. The method of claim 1 wherein a constant electrode voltage is applied to the cell containing said cathode during the electrolysis.

11. The method of claim 10 wherein said cell has an electroconductive metal anode and said constant voltage is about 1.6 to 2.0 volts.

12. The method of claim 10 wherein said cell has a graphite anode and said constant voltage is about 1.9 to 2.5 volts.

13. The method of claim 1 carried out in a membrane electrolytic cell wherein an anode compartment and a cathode compartment of the cell are separated by an ion-exchange membrane.

14. the method of claim 13 wherein the linear catholyte flow rate of said mineral acid through said cathode compartment is about 10 to about 30 cm/min and the linear flow rate of an anolyte through the anode compartment is about 1 to about 10 cm/min.

15. The method of claim 1 wherein the linear catholyte flow rate of said mineral acid in contact with said cathode is about 10 to about 30 cm/min.

16. A method for the removal of dissolved arsenic (III) ions from a mineral acid, which comprises:
chemically reducing any pentavalent arsenic ions present in the mineral acid to arsenic (III) ions,
cathodically reducing the dissolved arsenic (III) ions to metallic arsenic in an electrolytic cell having a large surface area cathode having a three-dimensional electrolyte-contacting surface, and
depositing the arsenic metal so produced on said cathode.

* * * * *